(12) United States Patent
Ozaki (10) Patent No.: US 9,825,401 B2
(45) Date of Patent: Nov. 21, 2017

(54) CONNECTOR WITH A BIASING ELASTIC MEMBER

(71) Applicant: Yazaki Corporation, Tokyo (JP)

(72) Inventor: Masahito Ozaki, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/638,422

(22) Filed: Mar. 4, 2015

(65) Prior Publication Data

US 2015/0255920 A1 Sep. 10, 2015

(30) Foreign Application Priority Data

Mar. 7, 2014 (JP) ................................. 2014-045267

(51) Int. Cl.
| | |
|---|---|
| *H04N 5/225* | (2006.01) |
| *H01R 13/627* | (2006.01) |
| *H01R 13/52* | (2006.01) |
| *H01R 13/66* | (2006.01) |

(52) U.S. Cl.
CPC ....... *H01R 13/627* (2013.01); *H01R 13/5202* (2013.01); *H01R 13/6658* (2013.01); *H04N 5/2257* (2013.01); *H04N 5/2253* (2013.01); *H04N 5/2254* (2013.01)

(58) Field of Classification Search
CPC .............. H01R 13/627; H01R 13/5202; H01R 13/6658; H04N 5/2254; H04N 5/2253
See application file for complete search history.

(56) References Cited

U.S. PATENT DOCUMENTS

| 8,982,273 | B2* | 3/2015 | Bingle | B60R 11/04 |
|---|---|---|---|---|
| | | | | 348/148 |
| 2008/0075442 | A1* | 3/2008 | Yamashita | B60R 11/04 |
| | | | | 396/25 |
| 2010/0323557 | A1* | 12/2010 | Seiler | H01R 13/5205 |
| | | | | 439/589 |
| 2011/0025850 | A1* | 2/2011 | Maekawa | H05K 9/002 |
| | | | | 348/148 |
| 2011/0199485 | A1* | 8/2011 | Nakamura | G02B 13/001 |
| | | | | 348/148 |

(Continued)

FOREIGN PATENT DOCUMENTS

JP 2011-258422 A 12/2011

*Primary Examiner* — Twyler Haskins
*Assistant Examiner* — Wesley Chiu
(74) *Attorney, Agent, or Firm* — Sughrue Mion, PLLC (57) ABSTRACT

A connector is adapted to be attached to a case of an electronic device unit. The connector includes a connector assembly adapted to be accommodated in the case through an opening provided in the case, an escutcheon adapted to be attached to the case to close the opening, and an elastic member arranged at a position to be interposed between the connector assembly and the escutcheon when the escutcheon is attached to the case in a state in which the connector assembly is accommodated in the case. The connector assembly includes a terminal, a housing holding the terminal, and a circuit board connected to the terminal. The elastic member is configured to bias the connector assembly toward the case such that the circuit board is pressed against the case to position the connector assembly with respect to the case.

8 Claims, 6 Drawing Sheets

(56) References Cited

U.S. PATENT DOCUMENTS

2011/0298925 A1* 12/2011 Inoue .................. H04N 5/2252
            348/148
2014/0148019 A1* 5/2014 Sasaki .................. H01R 13/516
            439/65

* cited by examiner

CONNECTOR WITH A BIASING ELASTIC MEMBER

CROSS-REFERENCE TO RELATED APPLICATIONS

The present application claims priority from Japanese Patent Application No. 2014-045267 filed on Mar. 7, 2014, the entire content of which is incorporated herein by reference.

FIELD OF INVENTION

The present invention relates to a connector to be attached to a case of an electronic device unit such as a camera module.

RELATED ART

Related art connectors are adapted to be attached to a connector attachment hole formed in a housing of an electronic device to electrically connect a contact portion of a circuit board accommodated in the housing to a contact portion of an external apparatus to be attached to the electronic device. In some of the connectors, a rubber member is provided to be tightly attached to the connector attachment hole (see, e.g., JP2011-258422A)

Sometimes, an engagement structure is provided in the housing to hold the circuit board. However, with the circuit board being held inside the housing by the engagement structure, the circuit board is, strictly speaking, not fixed to the housing due to a dimensional tolerance, and the circuit board may be displaced from a desired attachment position. For example, in a case in which the electronic device is a camera module, if the circuit board is displaced from a desired attachment position in the housing of the camera module, a position of an imaging device on the circuit board may be displaced with respect to a lens unit, in which case quality of an image obtained through the camera module may be lowered.

SUMMARY

Illustrative aspects of the present invention provide a connector that can reliably hold a circuit board in position.

According to an illustrative aspect of the present invention, a connector adapted to be attached to a case of an electronic device unit is provided. The connector includes a connector assembly adapted to be accommodated in the case through an opening provided in the case, an escutcheon adapted to be attached to the case to close the opening, and an elastic member arranged at a position to be interposed between the connector assembly and the escutcheon when the escutcheon is attached to the case in a state in which the connector assembly is accommodated in the case. The connector assembly includes a terminal, a housing holding the terminal, and a circuit board connected to the terminal. The elastic member is configured to bias the connector assembly toward the case such that the circuit board is pressed against the case to position the connector assembly with respect to the case.

Other aspects and advantages of the invention will be apparent from the following description, the drawings and the claims.

DETAILED DESCRIPTION

Hereinafter, exemplary embodiments of the present invention will be described in detail with reference to the drawings. However, the following exemplary embodiments do not limit the scope of the claimed invention.

Figure 1:
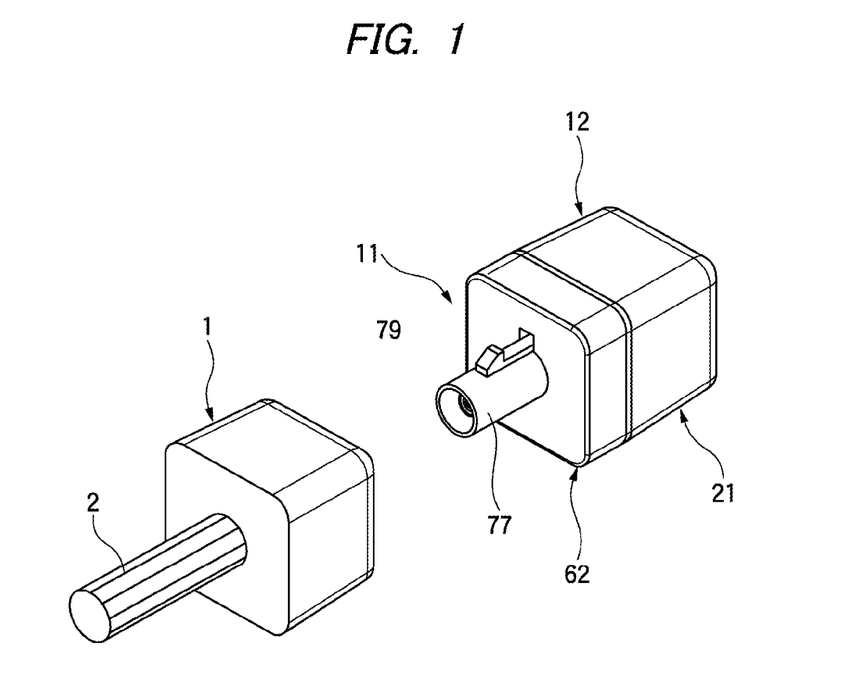
FIG. 1 is a perspective view of a camera module, including a connector according to an exemplary embodiment of the present invention, and a counterpart connector.
Figure 2:
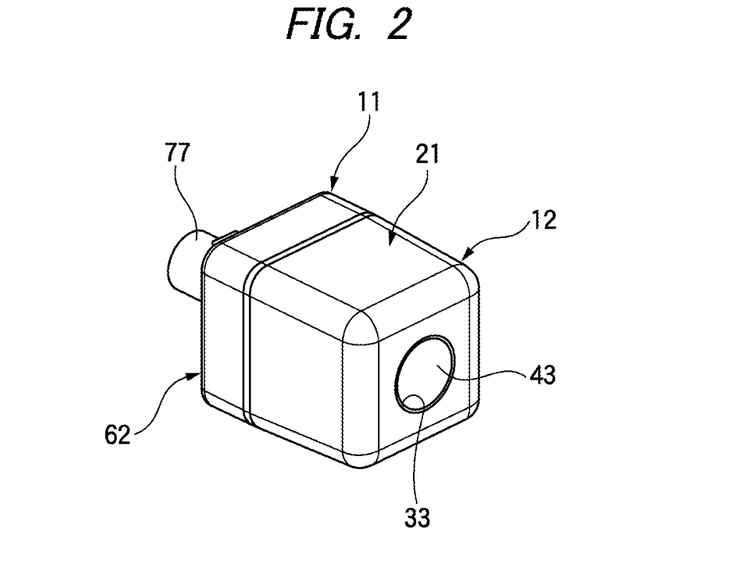
FIG. 2 is a perspective view of the camera module as viewed from the front side.

FIG. 1 is a perspective view of a camera module, including a connector according to an exemplary embodiment of the present invention, and a counterpart connector. FIG. 2 is a perspective view of the camera module as viewed from the front side.

As shown in FIGS. 1 and 2, the connector 11 is adapted to be attached to a camera module 12 (an example of an electronic device unit). The camera module 12 is opened on a side opposite to a camera lens 43, and the connector 11 is attached to this opening. The connector 11 is configured such that one side is attached to the camera module 12 and the other side can be fitted to a counterpart connector 1. The counterpart connector 1 has an electric wire 2 extending from a control device (not shown) or the like. When the connector 11 is fitted to the counterpart connector 1, a connector assembly 61, which will be described later, is electrically coupled to the electric wire 2. When the connector is attached to the camera module 12, a circuit board 73 of the connector assembly 61 is optically coupled to a lens unit 22. With this configuration, signals are transmitted and received between the control device and the camera module 12 through the electric wire 2.

Figure 3:
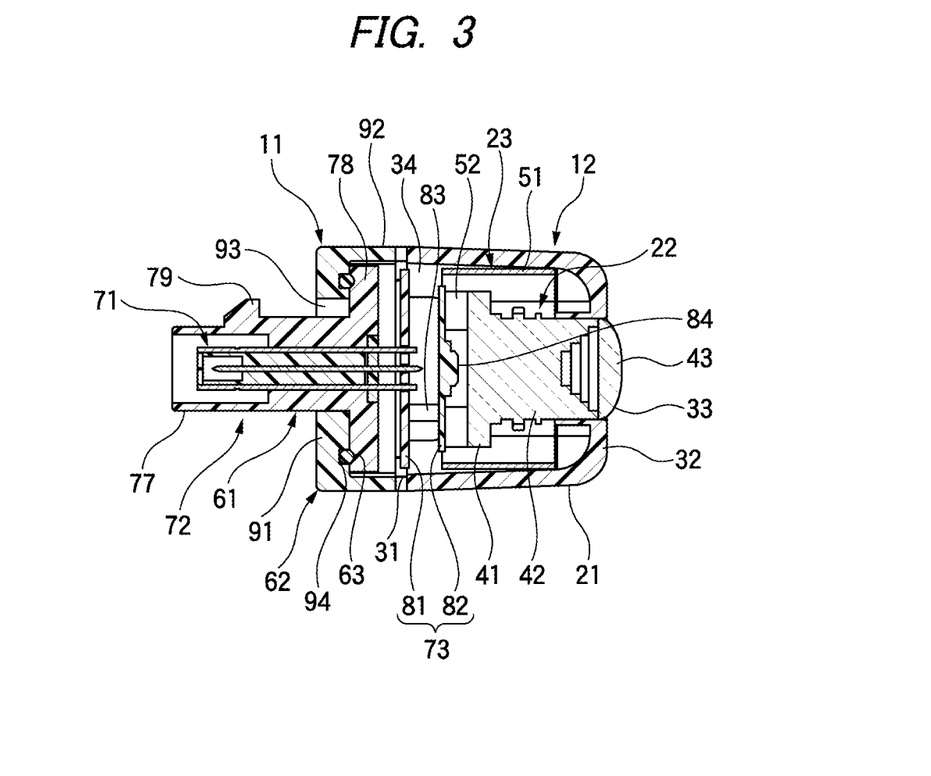
FIG. 3 is a sectional view of the camera module.
Figure 4:
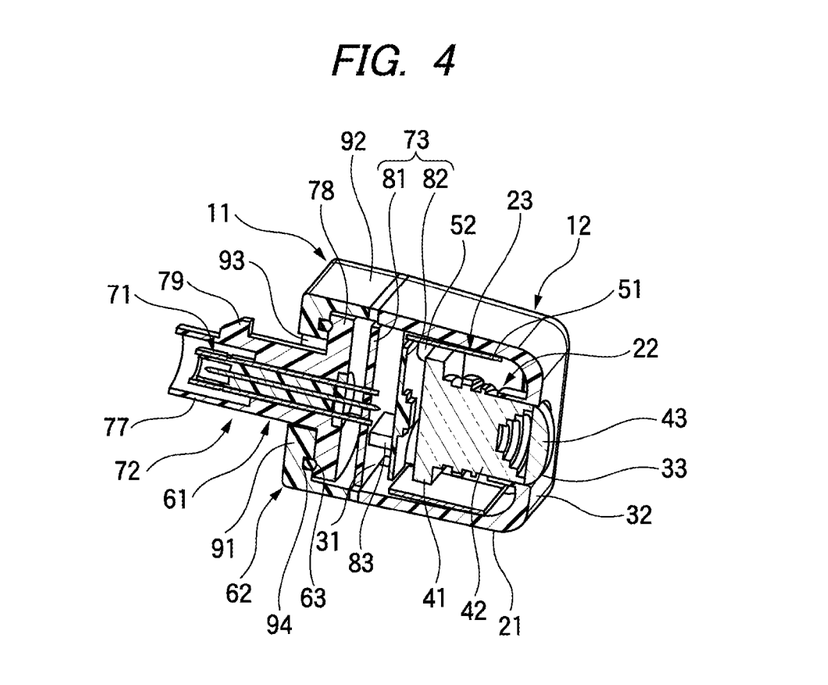
FIG. 4 is a perspective view showing a section of the camera module.
Figure 5:
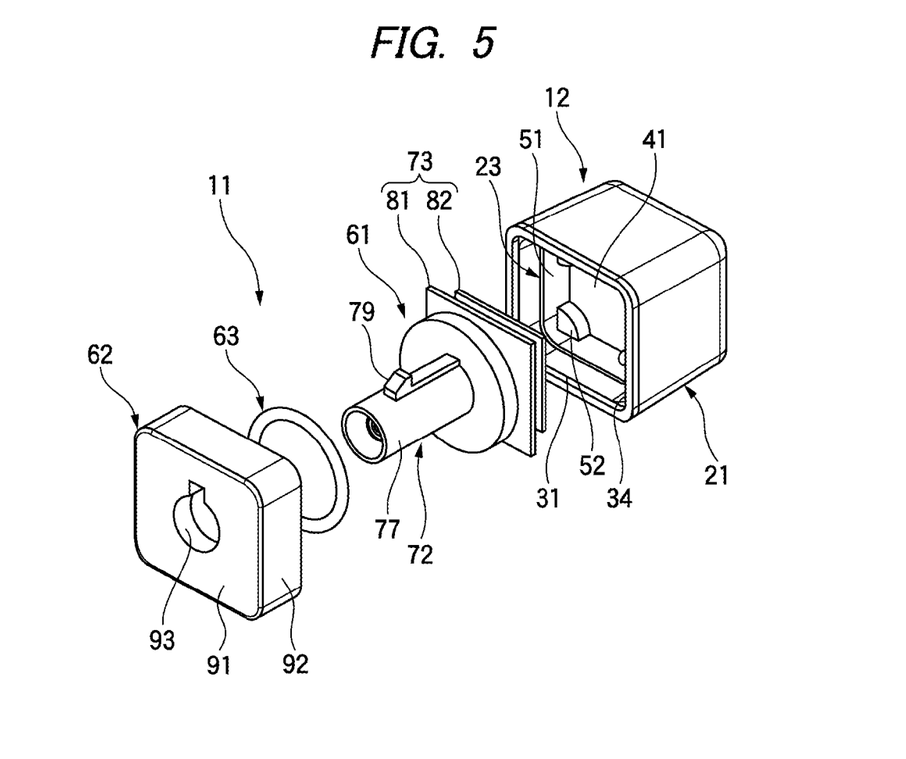
FIG. 5 is an exploded perspective view of the camera module.
Figure 6:
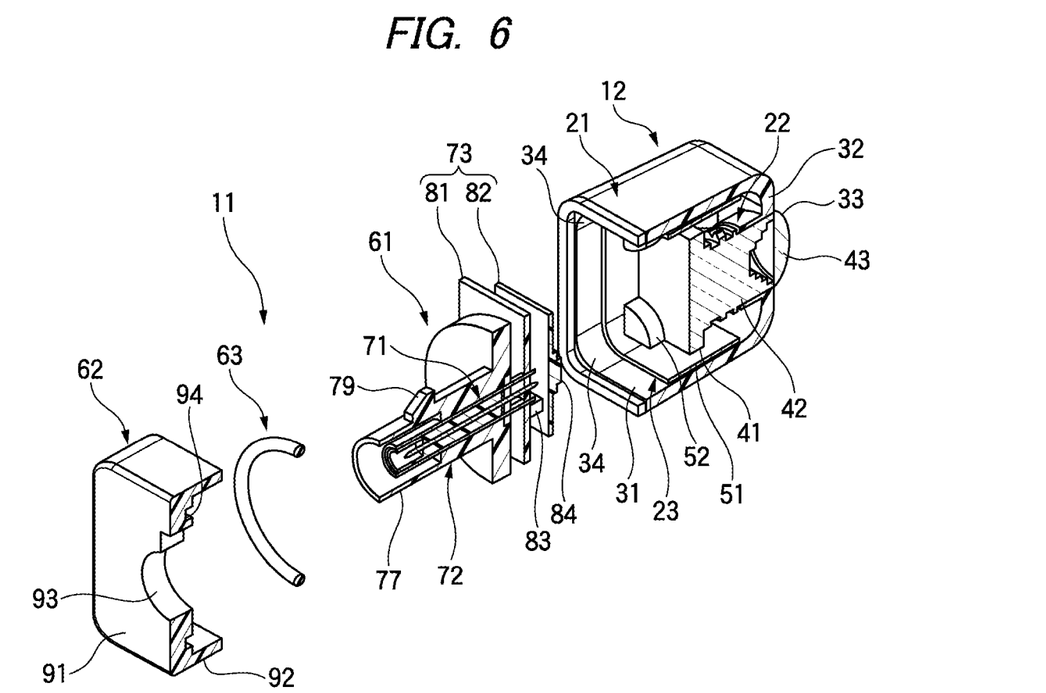
FIG. 6 is an exploded perspective view showing a section of the camera module.

FIG. 3 is a sectional view of the camera module 12, FIG. 4 is a perspective view showing a section of the camera module 12, FIG. 5 is an exploded perspective view of the camera module 12, and FIG. 6 is an exploded perspective view showing a section of the camera module 12.

As shown in FIGS. 3 to 6, the camera module 12 has a case 21, the lens unit 22, and a stationary cylinder 23.

The case 21 is molded from a synthetic resin, and is formed in a box shape having one end side being opened. The case 21 is formed with a hole 33 at a bottom 32 on a side opposite to the opening portion 31. The lens unit 22 and the stationary cylinder 23 are installed in the case 21 from the side of the opening portion 31 of the case 21. The case 21 has engagement protrusions 34 formed at four corners of the inner edge on the side of the opening portion 31.

The lens unit 22 has a flat portion 41 and an optical mechanism portion 42 extending from a central part of a surface of the flat portion 41. The camera lens 43 having a circular shape in a front view is provided at a distal end of the optical mechanism portion 42.

The stationary cylinder 23 has a cylinder body 51 to be fitted into the case 21. The cylinder body 51 is formed to have a rectangular cylindrical shape. The cylinder body 51 is made of, for example, an electrically conductive material, and serves to block electromagnetic waves which otherwise propagate into the case 21. Positioning protrusions 52 are provided to inwardly protrude at four corners of a rear end portion of the cylinder body 51.

The lens unit 22 and the stationary cylinder 23 are attached into the case 21 in the following manner. First, the stationary cylinder 23 is attached to the lens unit 22 by fitting the stationary cylinder 23 on the lens unit 22 from the side of the flat portion 41. Then, the stationary cylinder 23 attached to the lens unit 22 is fitted in the case 21 from the rear portion of the case 21, whereby the lens unit 22 and the stationary cylinder 23 are attached in the case 21. When the lens unit 22 is installed in the case 21 in this way, the camera lens 43 is located at a position to be exposed through the hole 33 of the case 21. In this state, the rear side of the flat portion 41 of the lens unit 22 is supported by the positioning protrusions 52 of the stationary cylinder 23. The case 21 and the stationary cylinder 23 are designed such that the inner diameter of the case 21 is substantially equal to the outer diameter of the stationary cylinder 23, so that when the stationary cylinder 23 is fixed with respect to the case 21, the lens unit 22 is arranged in a desired position by the positioning protrusions 52 and the hole 33.

Figure 7:
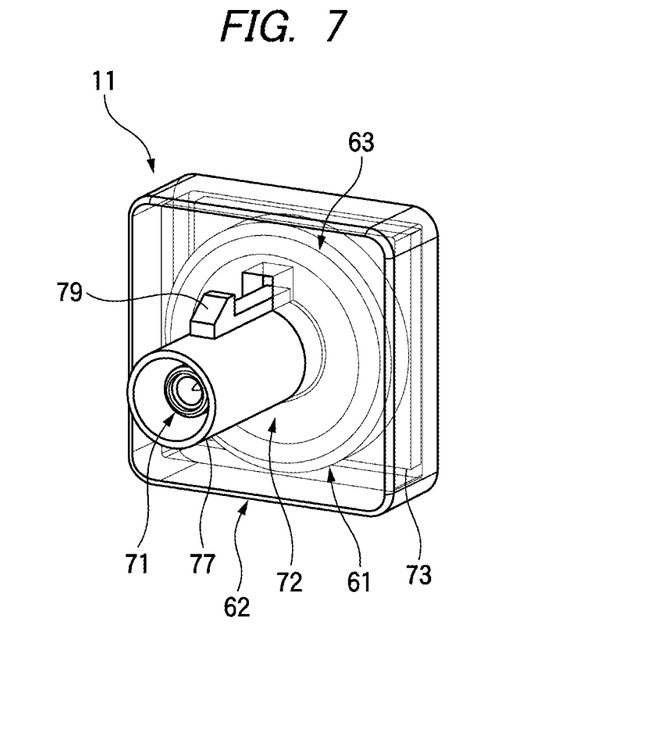
FIG. 7 is a perspective view of the connector with its escutcheon being made transparent.
Figure 8:
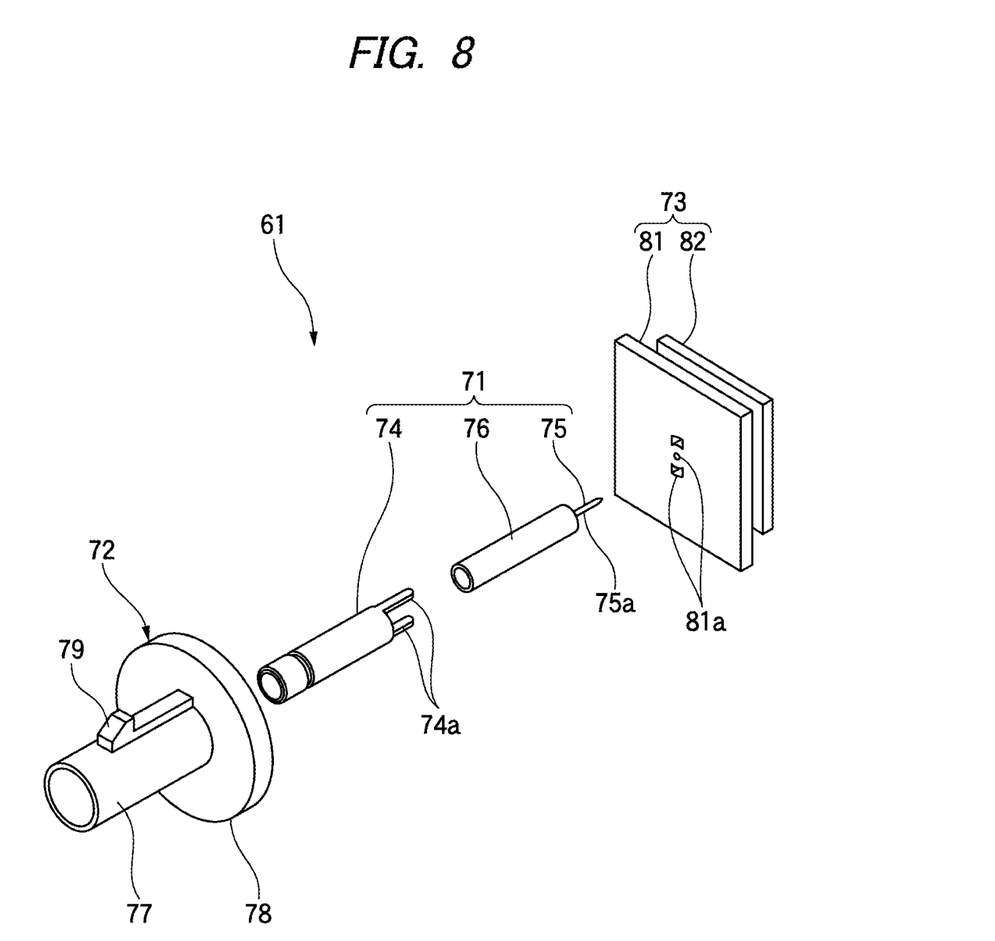
FIG. 8 is an exploded perspective view of a connector assembly of the connector.
Figure 9:
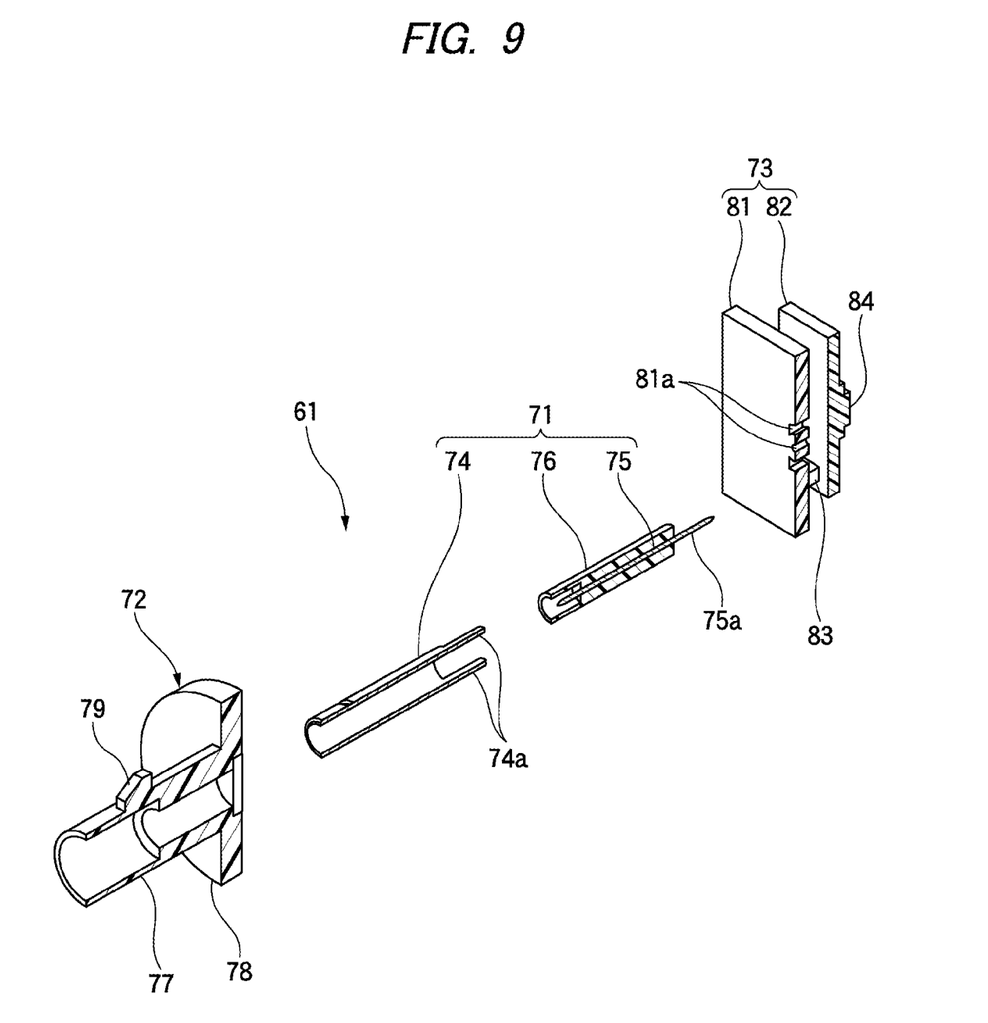
FIG. 9 is an exploded perspective view showing a section of the connector assembly.

FIG. 7 is a perspective view of the connector 11 with its escutcheon being made transparent, FIG. 8 is an exploded perspective view of the connector assembly 61 of the connector 11, and FIG. 9 is an exploded perspective view showing a section of the connector assembly 61.

The connector 11 is adapted to be attached to the case 21 of the camera module 12. As shown in FIG. 7, the connector 11 has the connector assembly 61, the escutcheon 62, and an elastic member 63.

As shown in FIGS. 3 to 9, the connector assembly 61 has a terminal 71, a housing 72, and the circuit board 73.

The connector assembly 61 is accommodated in the case 21 through the opening portion 31 of the case 2 of the camera module 12.

The terminal 71 has an inner conductor 74, an outer conductor 75, and an insulator 76. The inner conductor 74 and the outer conductor 75 are formed by an electrically conductive metal, and the insulator 76 is formed by an insulative resin material. The insulator 76 is disposed around the inner conductor 74, and the outer conductor 75 having a cylindrical shape is disposed around the insulator 76. With this configuration, the inner conductor 74 and the outer conductor 75 are integrated with each other such that they are electrically insulated from each other by the insulator 76. Inner conductor terminals 74a at an end portion of the inner conductor 74 is provide to protrude from one end of the insulator 76. The outer conductor 75 has an outer conductor terminal 75a extending at its one end.

The housing 72 has a connecting portion 77 formed into a cylindrical shape, and a flange portion 78 having a disk-like shape and provided on one end of the connecting portion 77. The terminal 71 is inserted into and fixed to the housing 72 from the side of the flange portion 78. An engagement portion 79 adapted to be engaged with the counterpart connector 1 is formed on the connecting portion 77 of the housing 72. The housing 72 is locked by the engagement portion 79 in a state in which the outer surface of the connecting portion 77 is fitted in a housing of the counterpart connector 1, and the housing of the counterpart connector 1 abuts the flange portion 78. At this time, a terminal of the counterpart connector 1 is inserted into the connecting portion 77 of the housing 72.

The circuit board 73 has a first board 81 and a second board 82. The first board 81 and the second board 82 are connected to each other by a rigid coupling member 83 with a space provided therebetween. The inner conductor terminals 74a of the inner conductor 74 and the outer conductor terminal 75a of the outer conductor 75 are inserted into through holes 81a, and are soldered to the first board 81, whereby the terminal 71 is fixed to the first board 81 of the circuit board 73. An imaging device 84 such as a charge coupled device (CCD) image sensor is mounted on a central part of the second board 82 on a side opposite to the first board 81. The coupling member 83 includes a conductor for a signal line, and a conductor for a ground line. Signal lines and ground lines of the first board 81 and the second board 82 are electrically coupled to each other via the conductors of the coupling member 83.

The escutcheon 62 is molded from a synthetic resin, and is adapted to be attached to the case 21 to close the opening portion 31 of the case 21. The escutcheon 62 has a front plate portion 91, and a peripheral wall 92 extending from the peripheral edge of the front plate portion 91 toward the case 21. The front plate portion 91 is formed, at its central part, with an insertion hole 93 through which the connecting portion 77 of the connector assembly 61 is inserted. An annular groove 94 surrounding the insertion hole 93 is formed on a surface of the front plate portion 91 on the side of the case 21.

The elastic member 63 is formed by an elastic material such as rubber. The elastic member 63 is configured as an O-ring having a ring shape that is larger than the insertion hole 93 of the escutcheon 62 and smaller than the flange portion 78 of the housing 72. The elastic member 63 has a circular sectional shape. The elastic member 63 is placed in the groove 94 formed on the front plate portion 91 of the escutcheon 62. The depth of the groove 94 is smaller than the diameter of the cross section of the elastic member 63. Therefore, the elastic member 63 placed in the groove 94 is attached to the escutcheon 62 such that the elastic member protrudes from the groove 94. The elastic member 63 is arranged at a position to be interposed between the flange portion 78 of the housing 72 of the connector assembly 61 and the front plate portion 91 of the escutcheon 62 when the escutcheon 62 is attached to the case 21 in a state in which the connector assembly 61 is accommodated in the case 21.

In the connector 11, the O-ring elastic member 63 is tightly attached to the flange portion 78 of the housing 72 of the connector assembly 61 and to the front plate portion 91 of the escutcheon 62. To allow the connecting portion 77 on which the engagement portion 79 is formed to be inserted through the insertion hole 93, the insertion hole 93 has a shape that allows the engagement portion 79 to pass therethrough. When the connector assembly 61 is attached to the escutcheon 62, a portion of the insertion hole 93 through which the engagement portion 79 passes remains unclosed, but the elastic member 63 prevents water and dust from entering the case 21 from a space between the insertion hole 93 of the escutcheon 62 and the connecting portion 77 of the connector assembly 61.

The structures of the connector 11 and the camera module 12 have been described in detail. When attaching the connector 11 to the camera module 12, the connector assembly 61 is accommodated in the case 21 through the opening portion 31 of the case 21 of the camera module 12. Then, the connecting portion 77 of the connector assembly 61 is passed through the insertion hole 93 of the escutcheon 62, and the escutcheon 62 is attached to the case 21 so as to close the opening portion 31 of the case 21. The elastic member 63 is provided in the groove 94 of the front plate portion 91 of the escutcheon 62 in advance. When attaching the escutcheon 62 to the case 21, the connector assembly 61 is moved to vertically and horizontally adjust the position of the second board 82 with respect to the case 21 as viewed in the imaging direction of lens unit 22. In this way, the optical axis is adjusted so that the imaging device 84 and the camera lens 43 of the lens unit 22 are opposed to each other in the correct position.

When the escutcheon 62 is attached to the case 21 in a state in which the connector assembly 61 is accommodated in the case 21, the elastic member 63 is sandwiched between the flange portion 78 of the housing 72 of the connector assembly 61 and the front plate portion 91 of the escutcheon 62 and is elastically deformed. Then, the connector assembly 61 is biased toward the case 21 by the elastic force of the elastic member 63. This presses the circuit board 73 against the case 21 so that the circuit board 73 is positioned with respect to the case 21. Specifically, the second board 82 is pressed against the positioning protrusions 52 of the stationary cylinder 23, and the first board 81 is pressed against the engagement protrusions 34 of the case 21. In this way, the circuit board 73 is positioned and maintained in position inside the case 21.

As described above, according to the connector 11 of the exemplary embodiment, the connector assembly 61 is biased toward the case 21 by the elastic member 63 arranged between the connector assembly 61 and the escutcheon 62, thereby enabling the circuit board 73 to be held with respect to the case 21 without a play. Therefore, the circuit board 73 is positioned and is maintained in position inside the case 21. Consequently, it is possible to hold the circuit board 73 in a desired posture and position with respect to the case 21. As a result, the imaging device 84 is positioned and maintained in position on the optical axis of the camera lens 43, whereby a favorable performance of the camera module 12 can be maintained.

According to the connector 11 of the exemplary embodiment, moreover, the connector 11 is configured as a combination of two components, namely, the connector assembly 61 and the escutcheon 62. The shape of the connector 11 is changed in accordance with the shapes of the camera module 12 to which the connector 11 is to be attached and the counterpart connector 1 to which the connector 11 is to be fitted. According to the structure in which the connector 11 is configured as a combination of two components as described above, by preparing a plurality of kinds of connector assemblies 61 and escutcheons 62 having different shapes, connectors 11 that are suitable for camera modules 12 and counterpart connectors 1 having various shapes can be provided by combining the two components.

Further, because the elastic member 63 is tightly attached to the flange portion 78 of the housing 72 of the connector assembly 61 and to the escutcheon 62, water and dust are prevented from entering the case 21 through a space between the insertion hole 93 of the escutcheon 62 and the connecting portion 77 of the connector assembly 61. Therefore, waterproofing and dustproofing properties can be ensured, and excellent performance can be maintained.

While the exemplary embodiment has been described with an example in which the connector 11 is attached to the camera module 12*d* the electronic device unit to which the connector 11 is to be attached is not limited to a camera module. The connector may be adapted to be attached to an electronic device unit having a case in which a circuit board is accommodated, such as an ECU unit or a sensor unit.

While the exemplary embodiment has been described with the ring shaped elastic member 63 as an example, the shape of the elastic member 63 is not limited to a ring shape. In so for as the elastic member is configured to bias the connector assembly 61 toward the case 21, the circuit board 73 can be positioned and maintained in position inside the case 21. Moreover, the elastic member 63 may be formed by a material other than a rubber material. In so far as the elastic member 63 is formed by an elastic material (for example, a metal leaf spring or other types of spring), it is possible to position the circuit board 73 and to maintain the circuit board 73 in position inside the case 21. With the elastic member 63 being made of a rubber material or the like, when the elastic member 63 is deformed and tightly attached to the flange portion 78 of the housing 72 of the connector assembly 61 and to the escutcheon 62, it is possible to prevent water and dust from entering the case 21 through a space between the insertion hole 93 of the escutcheon 62 and the connecting portion 77 of the connector assembly 61.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to the exemplary embodiments described above, a connector (11) is adapted to be attached to a case (21) of an electronic device unit (e.g., the camera module 12). The connector includes a connector assembly (61) adapted to be accommodated in the case through an opening (e.g., the opening portion 31) provided in the case, an escutcheon (62) adapted to be attached to the case to close the opening, and an elastic member (63) arranged at a position to be interposed between the connector assembly and the escutcheon when the escutcheon is attached to the case in a state in which the connector assembly is accommodated in the case. The connector assembly includes a terminal (71), a housing (72) holding the terminal, and a circuit board (73) connected to the terminal. The elastic member is configured to bias the connector assembly toward the case such that the circuit board is pressed against the case to position the connector assembly with respect to the case.

The housing may include a connecting portion (71) adapted to be connected to a counterpart connector (1), and a flange portion (78) formed on an end portion of the connecting portion. The escutcheon may have an insertion hole (93) in which the connecting portion is inserted. The elastic member may have a ring shape that is larger than the insertion hole and smaller than the flange portion, and may be held between the flange portion and the escutcheon.

The electronic device unit may be a camera module having the lens, and the imaging device (84) to be disposed on an optical axis of the lens may be mounted on the circuit board.

What is claimed is:

1. A connector adapted to be attached to a case of an electronic device unit, the connector comprising:
   a connector assembly comprising a terminal, a housing holding the terminal, and a circuit board connected to the terminal, wherein the terminal, the housing, and the circuit board are integrally attached together, and the connector assembly is configured to be integrally inserted in the case through an opening provided in the case;
   an escutcheon adapted to be attached to the case to close the opening; and an elastic member arranged at a position to be interposed between the connector assembly and the escutcheon when the escutcheon is attached to the case in a state in which the connector assembly is accommodated in the case, wherein the elastic member is configured to bias the connector assembly toward the case such that the circuit board is pressed directly against the case to position the connector assembly with respect to the case.

2. The connector according to claim 1, wherein the electronic device unit is a camera module having a lens, and an imaging device to be disposed on an optical axis of the lens is mounted on the circuit board.

3. The connector according to claim 1, wherein the circuit board is pressed into contact with a protrusion of the electronic device unit.

4. The connector according to claim 1, wherein the opening of the case is provided in a rear of the case; and wherein the elastic member is configured to bias the connector assembly toward a front of the case such that the circuit board is pressed against the case to position the connector assembly with respect to the case.

5. The connector according to claim 1, wherein the elastic member is sandwiched directly between the connector assembly and the escutcheon.

6. A connector adapted to be attached to a case of an electronic device unit, the connector comprising:

a connector assembly comprising a terminal, a housing holding the terminal, and a circuit board connected to the terminal, wherein the terminal, the housing, and the circuit board are integrally attached together, and the connector assembly is configured to be integrally inserted in the case through an opening provided in the case;

an escutcheon adapted to be attached to the case to close the opening; and an elastic member arranged at a position to be interposed between the connector assembly and the escutcheon when the escutcheon is attached to the case in a state in which the connector assembly is accommodated in the case, wherein the elastic member is configured to bias the connector assembly toward the case such that the circuit board is pressed against the case to position the connector assembly with respect to the case, wherein the housing comprises a connecting portion adapted to be connected to a counterpart connector, and a flange portion formed on an end portion of the connecting portion, wherein the escutcheon has an insertion hole in which the connecting portion is inserted, and wherein the elastic member has a ring shape that is larger than the insertion hole and smaller than the flange portion, and is held between the flange portion and the escutcheon.

7. The connector according to claim 6, wherein the electronic device unit is a camera module having a lens, and an imaging device to be disposed on an optical axis of the lens is mounted on the circuit board.

8. A connector adapted to be attached to a case of an electronic device unit, the connector comprising:

a connector assembly comprising a terminal, a housing holding the terminal, and a circuit board connected to the terminal, wherein the terminal, the housing, and the circuit board are integrally attached together, and the connector assembly is configured to be integrally inserted in the case through an opening provided in the case;

an escutcheon adapted to be attached to the case to close the opening; and an elastic member arranged at a position to be interposed between the connector assembly and the escutcheon when the escutcheon is attached to the case in a state in which the connector assembly is accommodated in the case, wherein the elastic member is configured to bias the connector assembly toward the case such that the circuit board is pressed against the case to position the connector assembly with respect to the case, wherein the circuit board comprises a first circuit board and a second circuit board, wherein the first circuit board is pressed into contact with an engagement protrusion of the case, and wherein the second circuit board is pressed into contact with a positioning protrusion of the electronic device unit.

* * * * *